US008345841B2

United States Patent
Karlsson et al.

(10) Patent No.: US 8,345,841 B2
(45) Date of Patent: Jan. 1, 2013

(54) SUBSCRIBER PARTITIONING IN A CHARGING SYSTEM

(75) Inventors: Robert Karlsson, Karlskrona (SE); Johan Haggman, Rodeby (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1656 days.

(21) Appl. No.: 11/577,650

(22) PCT Filed: Oct. 21, 2005

(86) PCT No.: PCT/IB2005/003154
§ 371 (c)(1),
(2), (4) Date: Apr. 20, 2007

(87) PCT Pub. No.: WO2006/043165
PCT Pub. Date: Apr. 27, 2006

(65) Prior Publication Data
US 2007/0297585 A1  Dec. 27, 2007

(30) Foreign Application Priority Data

Oct. 22, 2004 (SE) ........................................ 0402584
Oct. 22, 2004 (SE) ........................................ 0402586

(51) Int. Cl.
*H04M 15/00* (2006.01)

(52) U.S. Cl. ......... 379/114.28; 379/100.04; 379/114.01; 379/13

(58) Field of Classification Search .................... 379/13, 379/100.04, 114.01, 114.28, 121.02
See application file for complete search history.

(56) References Cited

U.S. PATENT DOCUMENTS

| 5,659,599 | A | * | 8/1997 | Arumainayagam et al. | 379/67.1 |
| 5,790,643 | A | * | 8/1998 | Gordon et al. | 379/119 |
| 6,199,047 | B1 | | 3/2001 | Dimino et al. | |

FOREIGN PATENT DOCUMENTS

| WO | WO 95/24093 | * | 9/1995 |
| WO | WO 95/24093 A | | 9/1995 |
| WO | WO 00/07354 A | | 2/2000 |
| WO | WO 03/026267 | * | 3/2003 |
| WO | WO 03/026267 A | | 3/2003 |
| WO | WO 03/094494 A | | 11/2003 |
| WO | WO 2004/045142 A | | 5/2004 |

* cited by examiner

Primary Examiner — Yuwen Pan
Assistant Examiner — Yosef K Laekemariam

(57) ABSTRACT

A charging device (100) and method (600) are described herein that can segment subscribers on a service class level and then can further segment those subscribers on an account level by using a service offerings parameter (105). The subscribers use communication services such as circuit switched voice, SMS, MMS and/or GPRS.

14 Claims, 6 Drawing Sheets

FIG. 4A                    FIG. 4B

SUBSCRIBER PARTITIONING IN A CHARGING SYSTEM

CLAIMING BENEFIT OF PRIOR FILED SWEDISH APPLICATIONS

This application claims the benefit of two Swedish Patent Applications having Serial Nos. SE 0402586-2 and SE 0402584-7 both of which were filed on Oct. 22, 2004 and both of which are incorporated by reference herein.

BACKGROUND OF THE INVENTION

1. Field of the Invention

The present invention relates in general to the communications field and, in particular, to a charging system and method capable of segmenting subscribers on a service class level and further capable of segmenting those subscribers on an account level using a service offerings parameter.

2. Description of Related Art

The following abbreviations are herewith defined, at least some of which are referred to in the ensuing description of the prior art and the present invention.

CDR Call Data Record
CS Content Server
EoCN End of Call Notification
GMSC Gateway Mobile Services Switching Centre
GPRS General Package Radio Services
GSM Global System for Mobile Communications
GUI Graphical User Interface
ISDN Integrated Services Digital Network
LE Local Exchange
MMS Multimedia Messaging Service
MSC Mobile Services Switching Centre
NAS Network Access Server
PLMN Public Land Mobile Network
PSTN Public Switched Telecommunications Networks
SDP Service Data Point
SMS Short Message Service
SSF Service Switching Function
SSP Service Switching Point
TCP/IP Transmission Control Protocol/Internet Protocol
USSD Unstructured Supplementary Service Data Telecommunication operators today use a charging system to determine what to bill their subscribers for using their services (e.g., circuit switched voice, SMS, MMS and/or GPRS). The subscribers often have either a prepaid option or a postpaid option they can use to pay for a particular service. If a subscriber uses the postpaid option, then they pay for a service after it has been used, for example once a month. If a subscriber uses the prepaid option, then they pay before the usage of a service. Both these payment options can use real time charging, i.e. the charging process is done as a part of the rendering of a service to a subscriber. The postpaid option also supports non-real time charging, i.e. when the charging process is done after the service has been provided.

The traditional charging system relies on the use of service classes to segment subscribers for charging purposes. These service classes are used for all types of segmentation including, for example, differentiation of tariffs/ratings and USSD notifications. Essentially, during a charging session at least one calculation run based on a service call is performed by the charging system. For example, the charging system determines the price for a service by deciding the duration of the service, deciding the time of the service, deciding if a promotion analysis is used and so forth. This type of calculation run often utilizes several if/then conditions in a tariff decision structure that results in the price for the service.

WO 95/24093A (British Telecommunications Public Limited Company) 8 Sep. 1995 (1995-09-08) appears to disclose a system for pricing calls made by customers in a telecommunications network. The processor receives call records from the local exchange and data from the databases and uses the call records and data to price calls by evaluating a factor relating to the type of service used in the call, a factor relating to the type of customer, a factor relating to the locations of the calling and called number in the network and a factor relating to the day on which the call is made. The values of the factors are used to select the tariff from the set of call tariffs stored in a database and the call is then priced in accordance with this tariff.

WO 03/094494A2 (Telefonaktiebolaget LM Ericsson) 13 Nov. 2003 (2003-11-13) appears to disclose a method for determining rating data for services in a communications network, wherein an incoming charging request is received from a service element, data (e.g., a location number associated with a service or a subscriber) is accessed, and a tariff structure is traversed. The tariff structure may contain branching conditions that are based on data stored in identified lists of identifiers and associated data.

U.S. Pat. No. 6,199,047B1 (Dimino et al.) 6 Mar. 2001 (2001-03-06) appears to disclose an event rating engine that is logically decoupled from a rating database and obtains rating rules from the rating database. The rating engine receives a usage event message that contains a list of input variables and associated values that are used, in part, to execute the appropriate procedure and output the amount charged for the event.

WO 00/07354A (American Management Systems, Inc.) 10 Feb. 2000 (2000-02-10) appears to disclose a ratings engine system that uses decision networks to select and execute price plans to rate an event. The price plans and rule sets are stored in a database. Conditions are also evaluated as the rule sets are traversed and include a program that determines if an event qualifies for the condition.

WO 2004/045142A1 (British Telecommunications Public Limited Company) 27 May 2004 (2004-05-27) appears to disclose a method for generating a rate model for use in determining a rate to be applied with respect to an instance of a product or service, system or process. The rate model includes: (i) data defining a rating space having at least one dimension defined by an attribute of the system, process, product or service; (ii) a rating vector definition comprising at least one rate parameter; and (iii) data which defines distinct regions in the rating space over which the defined rating vector is invariant, and which defines the respective invariant rating vector for each distinct region.

WO 03/026267A2 (Orange Personal Communications Services Limited) 27 Mar. 2003 (2003-03-27) appears to disclose a method of determining rating data for use in rating a service requested to be provided to a subscriber of a telecommunications system. Individual subscriber records are stored that contain information identifying one or more parameters of a service. The rating data is determined based on the stored information that matches the requested service.

However, the traditional charging system has a major drawback in that there is no way to segment the subscribers except by using service classes. The use of service classes to segment all of the subscribers is very inefficient both from a system resource perspective and from an administrative perspective since the number of service classes increases exponentially with the number of parameters (e.g., tariffs, discounts, bundled discounts, bonuses) that are used to differentiate the subscribers. This problem and other problems are solved by the present invention.

BRIEF DESCRIPTION OF THE INVENTION

The present invention is related to a charging device and a method that can segment subscribers on a service class level and then can further segment those subscribers on an account level by using a service offerings parameter. In one embodiment, the method includes the steps of: (a) using a service class identifier to identify a decision structure that is used to segment a plurality of subscribers; (b) adding a service offerings parameter within an account of at least one of the subscribers; and (c) using one or more bits (or flags) in at least one of the service offerings parameters as a decision parameter in a conditional switch within the decision structure to further segment the subscribers. This method enables an operator to use the subscriber's service offerings parameter to override or alter the setting that is common for the subscriber's of the service class. For example, although USSD EoCN messages are turned on for the service class, a flag in a particular subscriber's service offerings parameter can give the result (through evaluation of an USSD EoCN decision structure) that no USSD messages are to be sent to that subscriber or that USSD messages can be sent to that subscriber only for specific traffic cases.

BRIEF DESCRIPTION OF THE DRAWINGS

A more complete understanding of the present invention may be had by reference to the following detailed description when taken in conjunction with the accompanying drawings wherein:

FIGS. 4A-4C are various block diagrams of exemplary multi-bit service offerings parameters that can be used by an operator to segment subscribers based on an account level in accordance with the present invention;

DETAILED DESCRIPTION OF THE DRAWINGS

Figure 1:
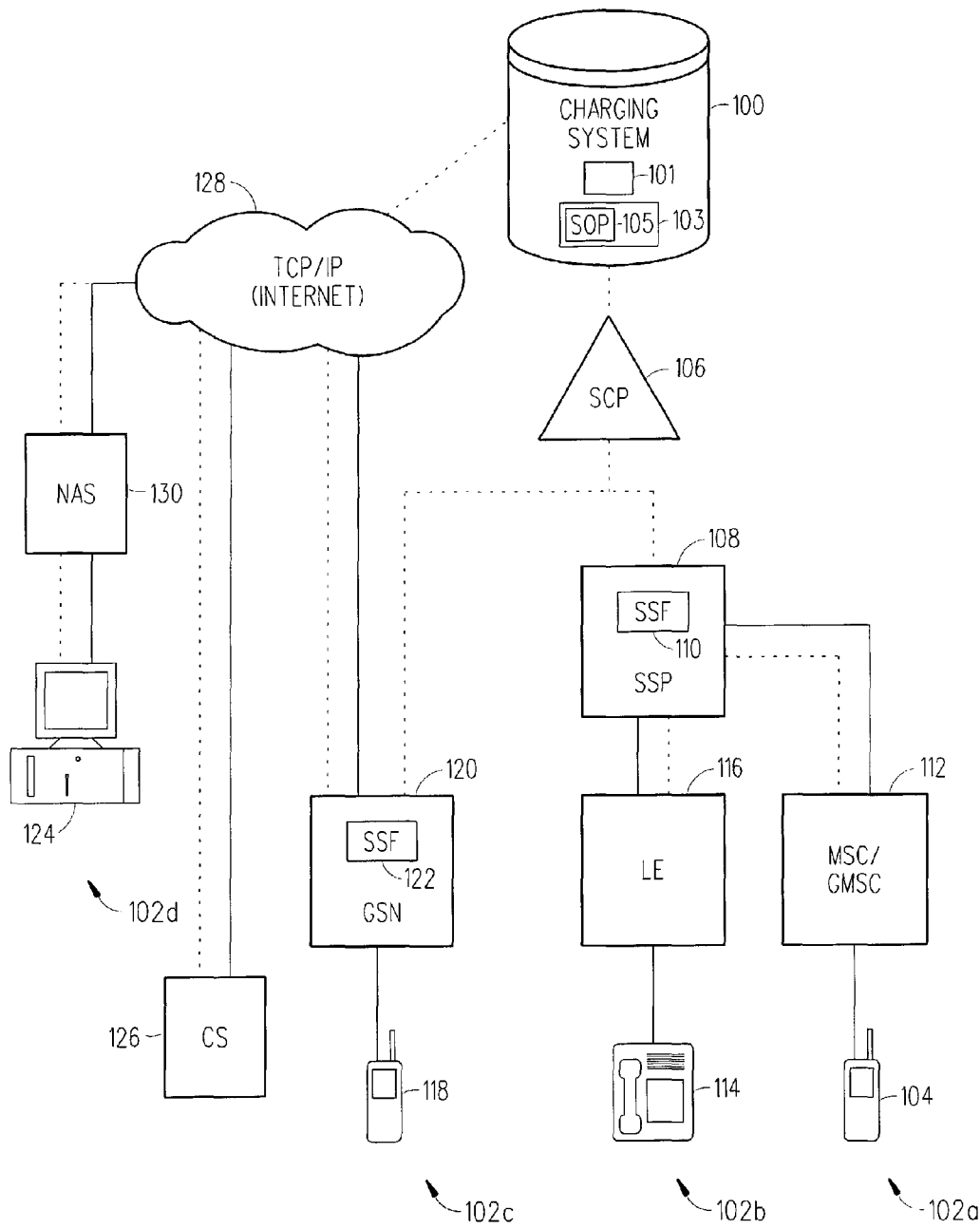
FIG. 1 is a block diagram of a charging system that is configured in accordance with the present invention.

Referring to FIG. 1, there is illustrated a block diagram of a charging system 100 that is interfaced with a variety of different communication networks 102a, 102b, 102c and 102d. In this example, the charging system 100 is shown to be interfaced with a GSM mobile communications network 102a, a PSTN 102b, a GPRS mobile communications network 102c and an Internet 102d. The charging system 100 needs to access and monitor the subscribers of these communication networks 102a, 102b, 102c and 102d. Examples of different access methods are described next.

If the charging system 100 accesses a subscriber via a portable radio communication unit 104, then the invocation is performed via a SCP 106 which is connected to a SSP 108 (and its SSF 110) that is in turn connected to a MSC/GMSC 112 which supports the portable radio communication unit 104. The term portable radio communication unit 104 which is referred hereinafter as mobile phone includes all equipment such as pagers, communicators, i.e. electronic organizers, smartphones or the like. The MSC/GMSC 112 provides specific data about individual mobile phones 104 and operates as an interface towards other networks such as an ISDN, another PLMN (e.g., GPRS mobile communications network 102c), or a PSTN (e.g., PSTN 102b).

If the charging system 100 accesses a subscriber via a fixed telephone 114, then the invocation is performed via the SCP 106 which is connected to the SSP 108 (and its SSF 110) that is in turn connected to a LE 116 which supports the fixed telephone 114. And, if the charging system 100 accesses a subscriber via a mobile phone 118 with GPRS capabilities, then the invocation is performed via the SCP 106 which is connected to a GSN 120 and its co-located SSF 122. Lastly, if the charging system 100 accesses a subscriber via a data terminal 124 (which is communicating with a CS 126), then the invocation is performed via a TC/IP network 128 (e.g., Internet 128) that is connected to a NAS 130. A mobile phone (not shown) accessing the CS 126 on the Internet 128 would operate in the same way as the data terminal 124, except that a GSN 120 would replace the NAS 130. For clarity, a detailed description about these communication networks 102a, 102d . . . 102d is not provided herein since their functions and components are well known in the industry and those details are not needed to understand the present invention.

As described below, the charging system 100 enables an operator to use a service class with a decision structure (decision tree) to segment subscribers and it also enables an operator to use flag(s) in multi-bit service offerings parameters to further segment those subscribers. To accomplish this, the charging system 100 (including a processor 101 and a database 103) uses a personalized service offerings parameter 105 to enhance the traditional service class concept and enable more flexibility in subscriber segmentation. Again, the use of service classes to segment all of the subscribers into numerous segments is not very efficient since the number of service classes increases exponentially with the number of parameters (e.g., tariffs, discounts, bundled discounts, bonuses) that are used to differentiate the subscribers. An example is provided next to illustrate the problem with segmenting subscribers based solely on service classes.

Figure 2A:
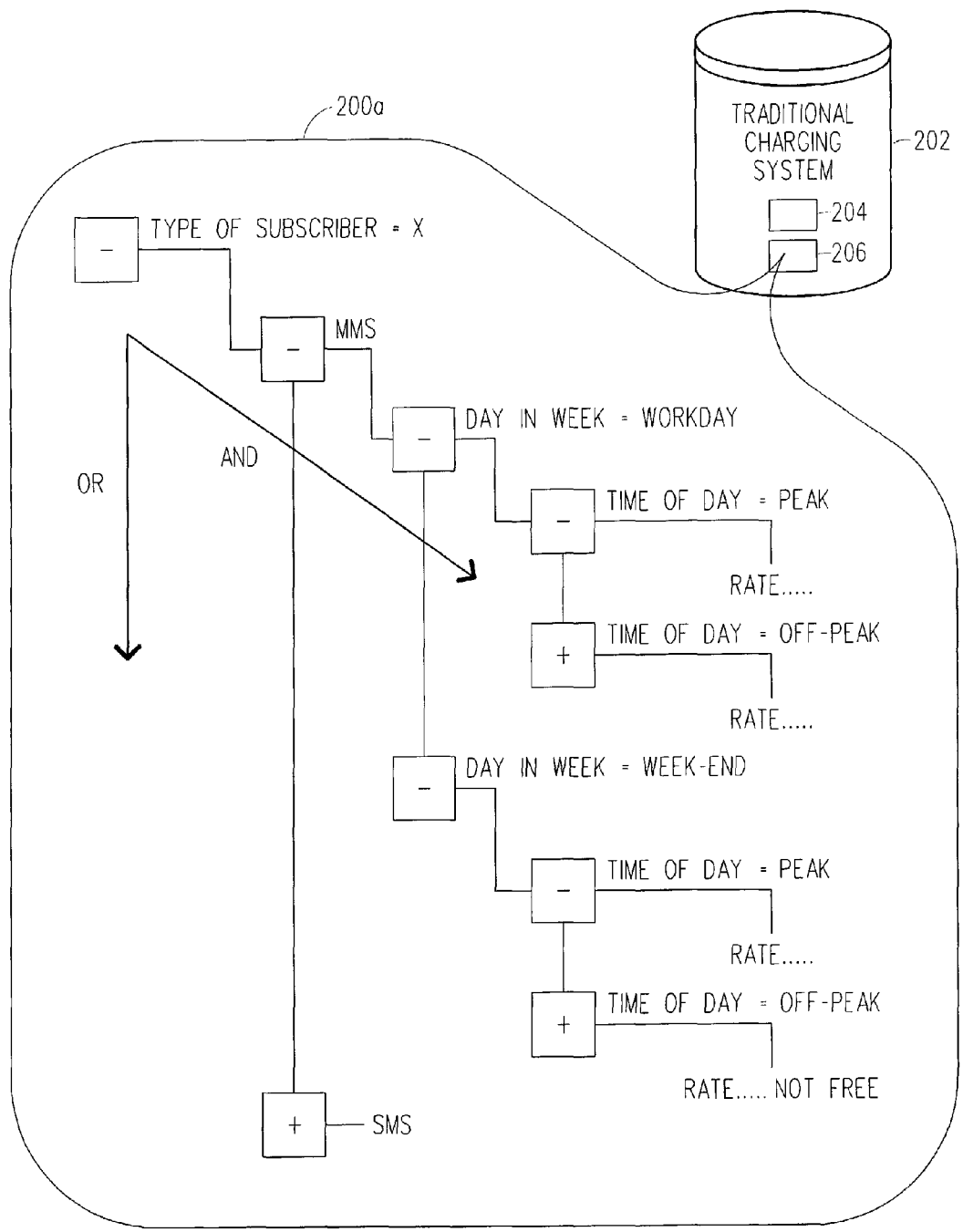
FIGS. 2A and 2B (PRIOR ART) are block diagrams which are used to help explain the problem with a traditional charging system that segments subscribers based only on service class levels.
Figure 2B:
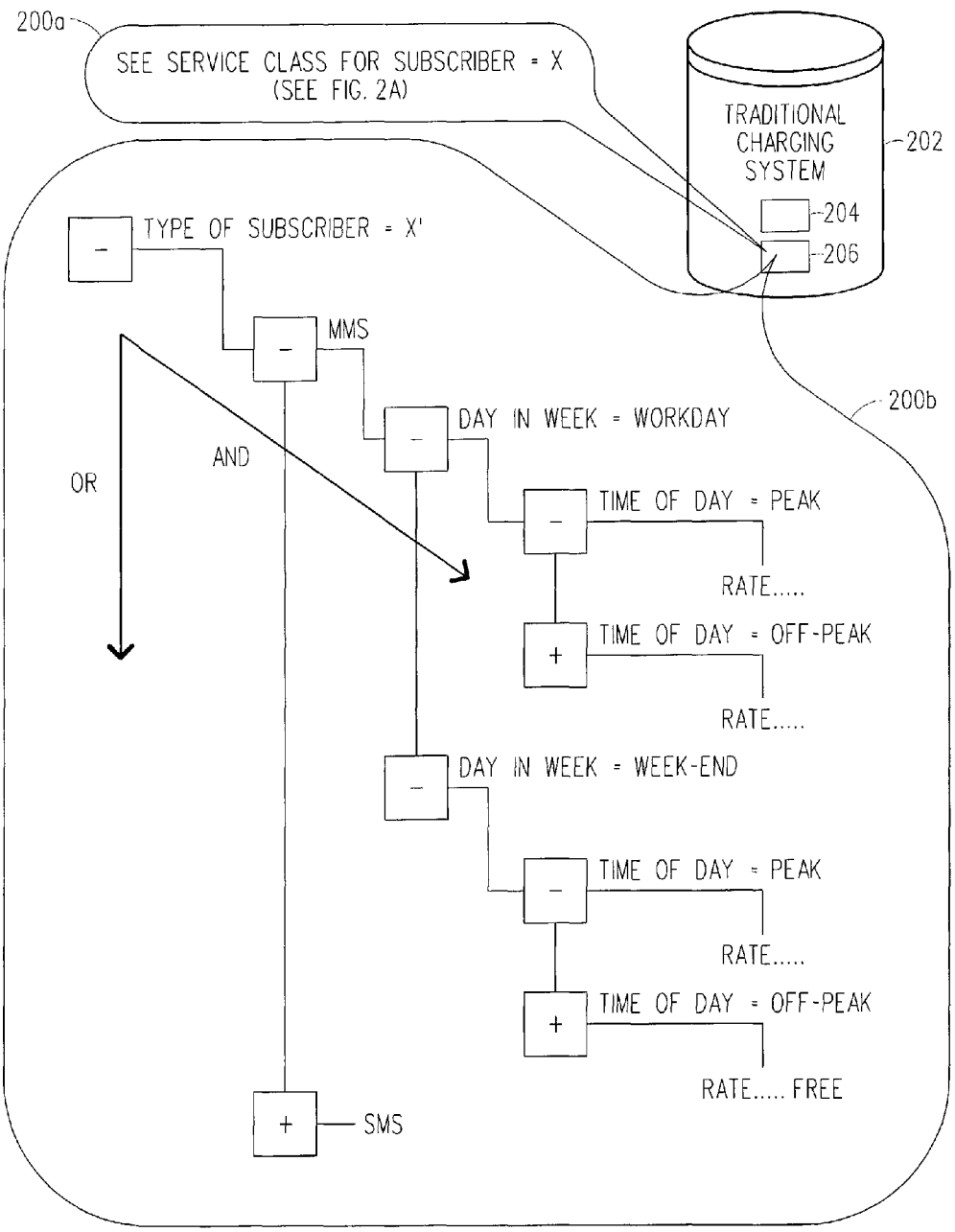

Referring to FIG. 2A (PRIOR ART), there is a diagram which illustrates the various conditions in a decision structure 200a that can be used by the traditional charging system 202 (including a processor 204 and a database 206) to determine the rate to charge a particular class of subscribers shown as "X" that use (or used) a MMS service on a particular day and at a particular time. Assume, the operator wants to offer a special rate on off-peak week-end usage of the MMS service to one (or more) of these subscribers referred to herein as subscriber "X'". Then, the operator will need to create a new service class specifically for subscriber "X'" which has a new decision structure 200b to take into account this special rate on off-peak week-end usage of the MMS service. FIG. 2B (PRIOR ART) is a diagram that shows the traditional charging system 202 implementing both service class decision structures 200a and 200b. As can be seen, these two service class decision structures 200a and 200b both of which are needed to distinguish the two subscriptions differ in only the rate which subscribers "X" and "X'" are charged for their off-peak week-end usage of a MMS service. This is not efficient.

Figure 3:
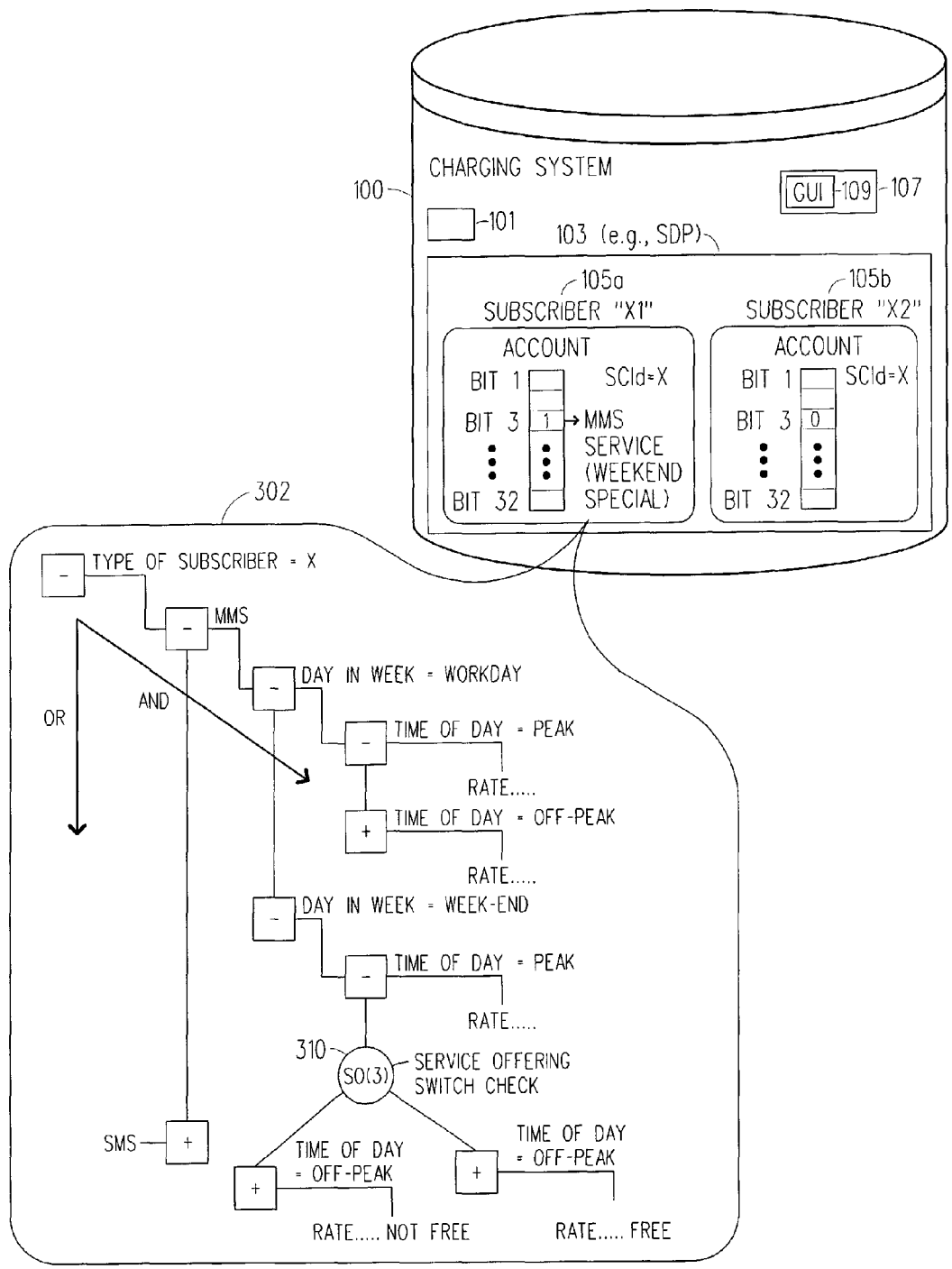
FIG. 3 is a block diagram which is used to help explain how the charging system shown in FIG. 1 can solve this problem by segmenting subscribers based on a service class level and then further segmenting those subscribers based on an account level using a multi-bit service offerings parameter in accordance with the present invention.

The charging system 100 addresses this in-efficient use of two different service classes which are needed to take into account subscriber "X" and subscribers "X" by using the service offerings parameter 105a of subscriber "X1" (corresponding to subscriber "X'" in FIG. 2B) to further segment subscriber "X1" from subscribers "X2" (corresponding to subscribers "X" in FIG. 2B) in view of one service class "X". FIG. 3 shows the charging system 100 (including a processor 101 and a database 103) with the service offerings parameter 105a (e.g., 32 bit service offerings parameter 105a) for subscriber "X1" where bit 3 is flagged (or set to "1"). This diagram also shows a decision structure 308 which can be used to take into account the different MMS week-end rates between subscribers "X1" and "X2". The decision structure 308 has a conditional switch 310 which requires the charging system 100 to refer to the service offerings parameters 105a and 105b stored therein to see if bit 3 (in this example) happens to be set to "1" or "0". If bit 3 is set to "1" as is the case for subscriber "X1", then the charging system 100 proceeds to the "right side" of the decision tree 302 to determine what rate to charge subscriber "X1" which in is this case is FREE. If bit 3 is set to "0" as is the case for subscribers "X2", then the charging system 100 proceeds to the "left side" of the decision tree 302 to determine what rate to charge subscribers "X2" which in this case is NOT FREE. In this example, the service offerings parameter 105a (which is stored in account data) is used to bitwise identify a discount related to a FREE MMS service. However, the service offerings parameter 105a can also be used to bitwise identify a wide variety of things like external services, bundled discounts and/or personalized USSD EoCN messages used by the subscriber (or subscribers in case of a multi-user account). This is described below.

As shown in FIG. 3, the service offerings parameter 105a and in particular bit 3 was used as a decision parameter in the conditional switch 310 located within the tariff tree structure 308. However, it should be appreciated that the service offerings parameters 105 and in particular anyone of the bits located therein can be used as a decision parameter in conditional switches 310 located in a wide variety of decision structures (various decision structures shown in FIG. 5). Moreover, one single conditional switch 310 in a decision structure can be configured to check several values (or bits) in the service offerings parameter 105 for a match. The conditional switch 310 is true as soon as a match is found. Furthermore, it is also possible to only check a part of the service offerings parameter 105 by specifying a masking parameter within the conditional switch 310. If a masking parameter is used, then a bitwise AND is done between the service offerings parameter 105 and the masking parameter. The result of this AND operation is then compared with the value(s) in the conditional switch 310.

The service offerings parameter 105 is fully configurable by the operator, that is, the operator can define the meaning of each bit. For example, bit 3 in the service offerings parameter 105a shown in FIG. 3 was defined by the operator to be associated with a MMS service weekend special. The other bits in the service offerings parameter could be defined to indicate a GPRS service, a weather service streaming service, personalized USSD EoCN messages, a newspaper subscription, an electricity provider etc. . . . (various examples shown in FIGS. 4A-4C). In the preferred embodiment, the service offerings parameter 105 is 32-bits which means that an operator can define up to 32 different personalized service offerings. Of course, more than 32 personalized service offerings can be defined if an operator uses two or more bits to define a generic personalized service offering. For instance, the operator can group 4 bits together for one generic personalized service offering and then define 16 different descriptions that can be used to identify 16 alternatives of that one generic personalized service offering.

The charging system 100 also has an administration system 107 which enables an operator to manage all of the service offerings parameters 105. For instance, the operator can use a GUI 109 to view and change the service offerings parameter 105 of an individual subscriber using a GUI 109. In particular, the operator can use the GUI 109 to enable, disable each bit in the service offerings parameter 105. And, the operator can use the GUI 109 to add configurable descriptive text to describe each bit in the service offerings parameter 105. The service offerings parameters 105 are present in the CDRs generated by charging system 100.

From the foregoing, it can be seen that the present invention is a marked improvement over the prior art. For instance, the present invention enables new campaigns to be implemented faster and easier as the subscriber offerings parameter 105 can be used to find subscribers from any service class who have for example activated a MMS service. The present invention also makes it easier to handle several offerings and campaigns at the same time which increases the segmentation possibilities. To further describe the some of the capabilities of the present invention, several different examples are discussed below which show how an operator can use the service offerings parameter 105 to segment subscribers.

EXAMPLE #1

The operator can use the service offerings parameter 105 to differentiate tariffs depending on:
  Which of the operator's own services that the subscriber uses. For example, special tariffs can be used for subscribers that use both GPRS and MMS.
  The subscriber segmentation used by the operator. For example, individual tariffs can apply for different categories of friendly users, gold subscribers and premium service subscribers.
  External services used by the subscriber. For example, if the subscriber subscribes to a specific newspaper or if he uses a specific electricity provider then they get a 15% discount on outgoing voice calls.

EXAMPLE #2

The personalized service offerings parameter 105 enables an operator to offer cross service class discount rates. For instance, all subscribers using the MMS, GPRS, weather service and streaming service regardless of service class, get a 5 percent discount on outgoing voice calls. This service offerings parameter 105 is shown in FIG. 4A, where if bit 4, 7, 10 and 12 are set to "1" or "Yes" for a particular subscriber, then that subscriber gets the 5% discount on outgoing voice calls.

EXAMPLE #3

The personalized service offerings parameter 105 enables an operator to award loyalty to a specific service provider (or association of service providers). For example, if a subscriber subscribes to either newspaper A or B he will get a 5% discount. However, if he subscribes to both newspapers A and B then he will get a 15% discount.

EXAMPLE #4

An operator can use the service offering parameter 105 to let two bits indicate if a subscriber has or has not joined campaigns A or B, as shown in FIG. 4B. In this case all subscribers, regardless of service class, who joined campaign A get every third MMS for free. All subscribers who have joined campaign B get a five percent discount on GPRS traffic. And, all subscribers who have joined both campaigns A and B get every third MMS for free, a five percent discount on GPRS traffic PLUS 10 percent discount on outgoing voice calls.

EXAMPLE #5

The personalized service offerings parameter 105 can indicate if a subscriber is pre-paid or postpaid.

EXAMPLE #6

The personalized service offerings parameter 105 may be used by an operator to offer cross-service discounts. For example, the operator may set a bit (or flag) in the service offerings parameter 105 to indicate a subscriber which has a newspaper subscription and a membership in a club. The subscriber with this parameter set may then get a special tariff and a special USSD End of Call message.

EXAMPLE #7

The operator can use the service offerings parameter 105 to override settings of a service class. For example, although USSD EoCN messages are turned on for the service class, a bit (or flag) in a subscriber's service offerings parameter 105 can give the result (through evaluation of the USSD EoCN selection tree) that no USSD messages are to be sent out to that subscriber. In this example, it should be appreciated that a "general rule" can be set according to a service class and then individual exemptions can be made on a subscriber account level using the service offerings parameter 105.

EXAMPLE #8

Figure 4C:
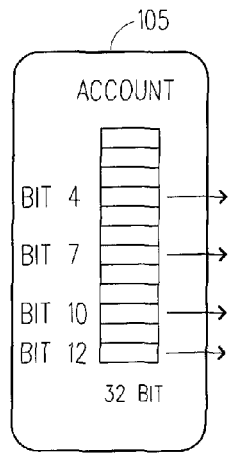
Figure 4C:
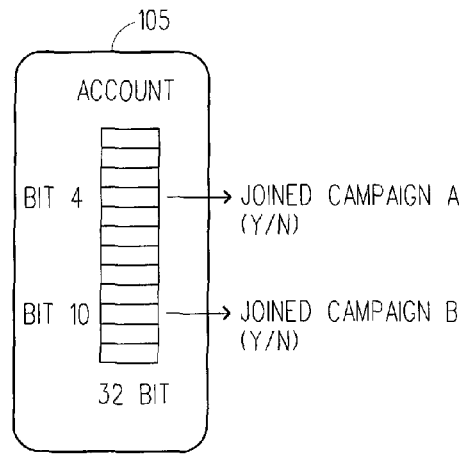
Figure 4C:
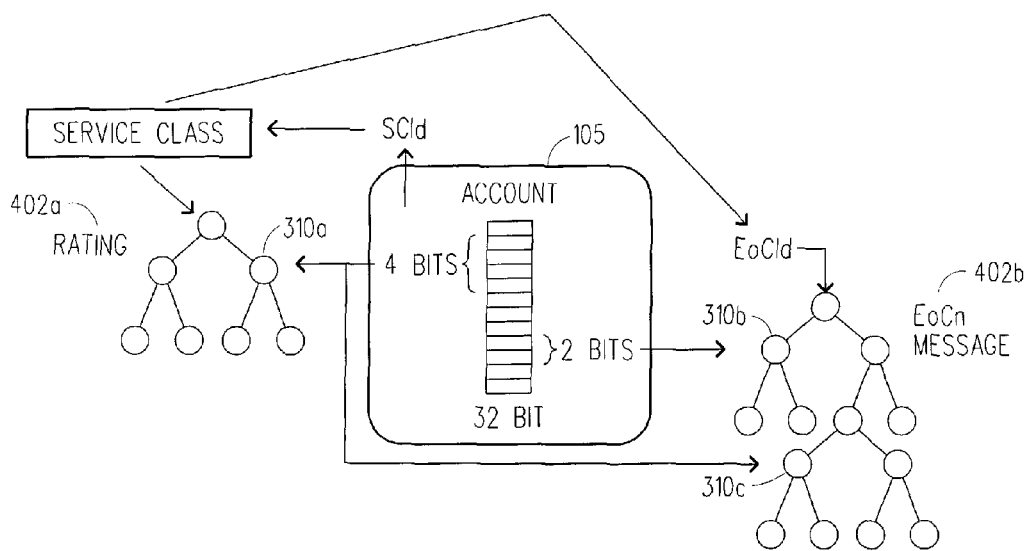

In this example, assume the service class points out a tariff structure 402a and an USSD EoCN structure 402b as shown in FIG. 4C. And, within these structures 402a and 402b there are branching conditions 310a, 310b and 310c that use the service offering parameter 105. In this case, bits 1-4 which can be set at '1100' (for example) are used both for the conditional switch 310a in the tariff structure 402a and also used for the conditional switch 310c in the USSD EoCN structure 402b. And, bits 10-11 which can be set at '00' (for example) are used just in the conditional switch 310b in the USSD EoCN structure 402b.

The aforementioned examples illustrate just some of the different ways an operator can use the service offerings parameter 105 to segment subscribers on an account level in view of a service class level.

Figure 5:
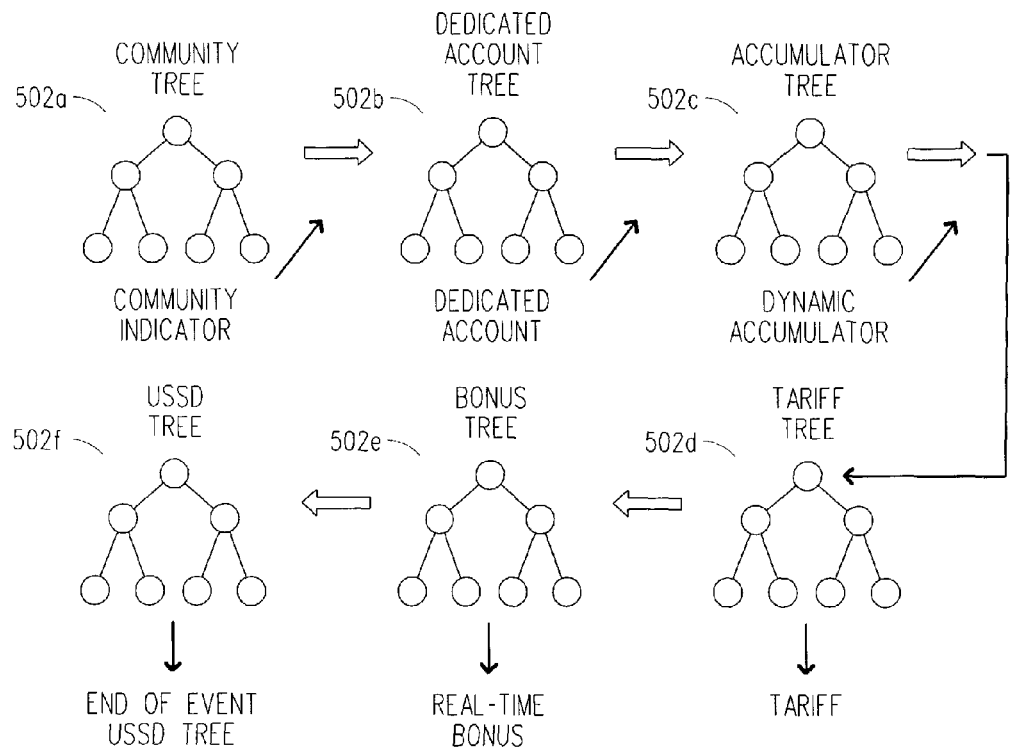
FIG. 5 is a diagram that illustrates a variety of service class level decision structures that can be used by the charging system shown in FIG. 1 in accordance with the present invention.

It was noted above that the service offerings parameter 105 and in particular anyone of the bits therein can be used as a branching condition for a wide variety of decision structures. FIG. 5 is a diagram that illustrates a variety of decision structures 502a, 502b . . . 502f that could be used by the charging system 100. In particular, FIG. 5 shows a whole chain of decision structures from a community tree 502a to a USSD EoCN tree 502f. This chain includes as follows: a community tree 502a, a dedicated account tree 502b, an accumulator tree 502c, a tariff tree 502d, a bonus tree 502e and an USSD EoCN tree 502f. Each decision tree 502a, 502b . . . 502f can be used as follows:

1. Community tree 502a: The community structure is used to determine if community charging is applicable for a call between two subscribers. For example, tariffs can be cheaper if both subscribers belong to the same group or community.

2. Dedicated account tree 502b: The dedicated account structure is used to specify a dedicated account that is to be charged during a call. A dedicated account is an account that is designated for a specific use defined by the operator. Money can be placed in the dedicated account, for example, as a promotion or a bonus awarded to the subscriber, and these funds would only be used by the subscriber for the specific services connected with that dedicated account.

3. Accumulator tree 502c: The accumulator structure is used to specify an accumulator that is to be active during the call. Accumulators are used to be able to differentiate charging and promotions based on the subscriber's accumulated usage of particular services, for example, SMS, Voice and GPRS. When a call triggers an accumulator, the accumulator will be active during the call and the accumulator's counter will be incremented with the airtime used or the amount of data sent, depending on the traffic scenario. The counter value can then be used as a basis for bonus evaluation or for rating the call.

4. Tariff tree 502d: The tariff structure is used for call rating. The evaluation of the tariff structure determines how voice calls and other services are charged. While a call is in progress, the structure is continually evaluated in order to determine the applicable charge during each stage of the call. Different rates or fees can be charged for a call depending on how the call meets certain defined conditions. Examples of call conditions can be the time of day the call is made, the service class the subscriber is connected to, or the traffic case valid for the call.

5. Bonus tree 502e: The bonus structure is used to calculate promotions based on the subscriber's accumulated usage. The calculation is performed at the end of call if an accumulator has been updated during the rating of the call.

6. USSD EoCN tree 502f: The USSD tree message structure is used to configure the USSD EoCN messages that can be sent to a subscriber at the start of call or when the call has ended.

Figure 6:
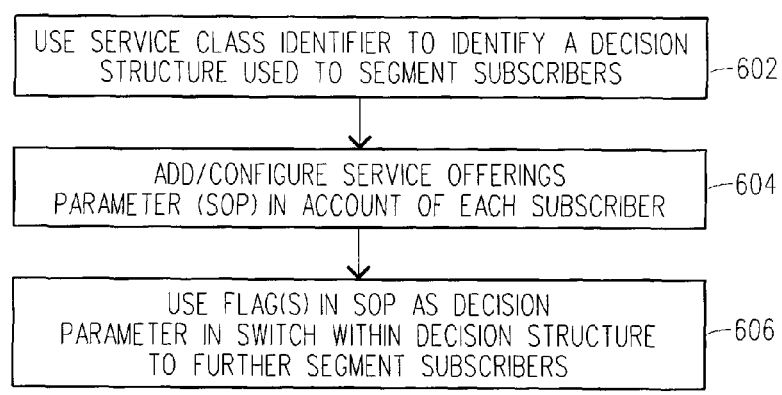
FIG. 6 is a flow diagram of the basic steps of a method for charging a subscriber in accordance with the present invention.

Referring to FIG. 6, there is a flow diagram illustrating the basic steps of a method 600 for charging a subscriber in accordance with the present invention. Beginning at step 602, the operator uses a service class identifier to identify a decision structure that is used to segment subscribers. At step 604, the operator adds and configures a service offerings parameter 105 within an account of at least one of the subscribers. At step 606, the operator uses one or more bits (or flags) in at least one of the service offerings parameters 105 as a decision parameter in a conditional switch 310 within the decision structure to further segment the subscribers. For example, the subscribers can be further segmented on an account level based on a tariff, a discount and/or an End of Call Notification. As described above, the operator can flexibly define each bit in the multi-bit service offerings parameters 105 to identify an external service, a discount, a bundled discount or a USSD EoCN message.

Following are some additional features of the present invention:

A. The operator can set an expiry date for anyone or all of the bits/flags in the service offerings parameter 105. This means that those bits/flags automatically reset or are set back to "0" at the expiry date. The operator could use the expiry date feature to promote campaigns that are stopped automatically. For example, the operator can offer a promotion to a subscriber where if they meet the conditions they can "get 50% off on SMS for the next 30 days".

B. An operator can charge a service fee for setting anyone or all of the bits/flags in the service offerings parameter 105. For example, the operator can deduct 10$ from an account when activating a bit/flag and setting an expiry date on the switch 310 for a new campaign.

C. An operator can give out a bonus by setting a flag in the service offering parameter 105 instead of as money to a dedicated account. This is an example of automated provisioning of switches. An example is that accumulators on the subscriber accounts count e.g. SMS usage. The bonus calculation can then, according to prior art, give rise to a bonus, such as "10$ extra for SMS usage". With this new feature an account service offering flag can instead be automatically set from the bonus calculation giving possibility for a more flexible way of setting up bonuses.

Following are some advantages of the present invention:
Benefits for the User and the Operator:
The service offering parameter 105 makes it possible to personalize the account and USSD End-of-Call Notification (EoCN) messages to a higher degree than has been possible in the past.

The service offering parameter 105 increases the possibilities for subscribers to personalize their mobile service.
Benefits for the Operator:
The service offering parameter 105 makes it possible for the operator to differentiate tariffs and USSD EoCN messages without having to add a new service class.

The service offering parameter 105 is very attractive for the operator because the operator can use it to override settings of the service class. For example, USSD EoCN messages can be 'turned off' for an individual subscriber even if they are 'turned on' for the service class. In particular, assume that a service class of "business users" normally will not get a USSD EoCN message about the remaining status on the account, but for a smaller part of the business users this notification is required. The operator may then use one bit in the service offering parameter 105 for this purpose and have a branching conditional in the ordinary business user's service class, so that those having that flag set will get the USSD EoCN message.

By changing the subscriber behavior, that is the setting of the service offerings parameter 105, the operator is able to quickly reconfigure the system. And, changes can be done both for individual subscribers and for a batch of subscribers on the same account.

The feature may reduce the number of needed service classes.

It should be appreciated that the processor 101 described herein can perform various actions in accordance with the present invention by using specialized circuits or circuitry (e.g., discrete logic gates interconnected to perform a specialized function), program instructions, or a combination of both.

Although one embodiment of the present invention has been illustrated in the accompanying Drawings and described in the foregoing Detailed Description, it should be understood that the invention is not limited to the embodiment disclosed, but is capable of numerous rearrangements, modifications and substitutions without departing from the spirit of the invention as set forth and defined by the following claims.

What is claimed is:

1. A method for charging a subscriber, said method comprising the steps of:
    using a service class identifier to identify a decision tree structure that is used to segment a plurality of subscribers,
    adding a multi-flag service offerings parameter within an account of at least one of the subscribers; and
    using at least one flag in at least one of the multi-flag service offerings parameters as a decision parameter in a conditional switch located within the decision tree structure to further segment the subscribers wherein an operator is allowed to flexibly define each flag in each multi-flag service offerings parameter to be used to identify at least one of an external service, a discount, a bundled discount, or a message, and said operator is allowed to set an expiry date for the each flag in each multi-flag service offerings parameter such that when a selected flag is set the selected flag will automatically reset at the expiry date.

2. The method of claim 1, wherein an operator is allowed to charge a service fee for configuring the at least one flag within the multi-flag service offerings parameter.

3. The method of claim 1, wherein said decision tree structure is selected from:
    a community decision structure;
    a dedicated account decision structure;
    an accumulator decision structure;
    a tariff decision structure;
    a bonus decision structure; or
    an EoCN decision structure.

4. The method of claim 1, wherein an operator is allowed to provision a conditional switch within the decision tree structure to automatically change at least one flag in the multi-flag service offerings parameter.

5. The method of claim 1, wherein when the at least one flag is automatically changed causes another tariff to be applied, and/or another message to be sent, and/or a bonus to be applied to the account of the at least one of the subscribers.

6. The method of claim 1, wherein said conditional switch further includes a masking parameter.

7. A charging system, comprising:
    a processor; and
    a database, wherein said processor and said database enable the following actions to be performed:
        use a service class identifier to identify a decision tree structure that is used to segment a plurality of subscribers;
        add a multi-flag service offerings parameter within an account of at least one of the subscribers; and
        use at least one flag in at least one of the multi-flag service offerings parameters as a decision parameter in a conditional switch located within the decision tree structure to further segment the subscribers wherein an operator is allowed to flexibly define each flag in each multi-flag service offerings parameter to be used to identify at least one of an external service, a tariff, a discount, a bundled discount, or a message, and said operator is allowed to set an expiry date for the each flag in each multi-flag service offerings parameter such that when a selected flag is set the selected flag will automatically reset at the expiry date.

8. The charging system of claim 7, wherein an operator is allowed to charge a service fee for configuring the at least one flag within the multi-flag service offerings parameter.

9. The charging system of claim 7, wherein said decision tree structure is selected from:
- a community decision structure;
- a dedicated account decision structure;
- an accumulator decision structure;
- a tariff decision structure;
- a bonus decision structure; or
- an EoCN decision structure.

10. The charging system of claim 7, wherein an operator is allowed to provision a conditional switch within the decision tree structure to automatically change at least one flag in the multi-flag service offerings parameter.

11. The charging system of claim 7, wherein said conditional switch further includes a masking parameter.

12. The charging system of claim 7, wherein said processor monitors a plurality of subscribers by interfacing with at least one of the following communications networks:
- a mobile communication network;
- a public switched telecommunications network;
- an Integrated Services Digital Network; and
- an Internet.

13. The charging system of claim 7, wherein each subscriber is either a pre-paid subscriber or a post-paid subscriber.

14. The charging system of claim 7, wherein an operator defines at least one flag in one of the multi-flag service offerings parameters associated with one of the subscribers and then uses that flag in the multi-flag service offerings parameter to make an individual exemption within a decision tree structure on the service class level.

* * * * *